3,189,480
PRESSURE SENSITIVE ADHESIVE SHEET MATERIAL WITH DIKETENE-ACRYLIC ACID ESTER COPOLYMER COATING
Kurt Franzen, Hamburg, and Horst Lehmann, Hamburg-Niendorf, Germany, assignors to P. Beiersdorf & Co. Aktiengesellschaft, Hamburg, Germany
No Drawing. Filed Apr. 23, 1962, Ser. No. 189,287
Claims priority, application Germany, Apr. 25, 1961, B 62,276
5 Claims. (Cl. 117—122)

This invention relates to self-adhesive tapes, bands, sheets and the like. More particularly, the invention relates to adhesive coated sheet material having adhesives based on copolymers of acrylic acid ester and diketene.

Although previously known polyacrylic acid ester adhesive substances are more resistant to the action of oxygen and light than are rubber-based adhesive materials, they exhibit thermoplasticity, cold flow and, owing to their ready solubility in organic solvents, high sensitivity to solvents.

Adhesive materials are known which are obtained by co-polymerisation of acrylic acid esters with a small quantity of a co-polymerisable monomer and which contains a highly polar group which is bound to the ethylene C-atom, such as acrylic acid, methacrylic acid, acrylic acid amide, methacrylic acid amide, acrylonitrile and/or methacrylonitrile. Such adhesive substances may be applied to flexible supports in the form of foil or fibre material and then be reacted on the supports by heating with polyfunctional compounds (for example, aliphatic polydiols, aliphatic polyamines, epoxy resins, amino alcohols) or with benzoyl peroxide. Pressure-sensitive adhesive strips produced in this way have improved resistance to solvents and reduced thermoplasticity, but have not always been satisfactory.

According to a first feature of the present invention there is provided adhesive coated sheet material having thereon adhesive materials which are co-polymerisation products of diketene with one or more acrylic acid esters of which the primary or secondary alcohol residues contain 1 to 14 carbon atoms in a branched or unbranched chain.

According to a further feature of the present invention there is provided self-adhesive tapes, bands, sheets, or the like which are very resistant to solvents and heat and which are made by applying to a flexible support, e.g. a support consisting of film of so-called plastic material, or of fibrous material, such as paper or fabric or of metal foils, an adhesive material having a basis of a co-polymer formed from one or more acrylic acid esters, the primary or secondary alkyl alcohol radicals of which contain 1 to 14 carbon atoms in a branched or unbranched chain, and diketene (β-hydroxy vinyl acetic acid lactone), and hardening said adhesive material on the support by the action of heat, e.g. at 100° C.–150° C.

The use of diketene as a compound suitable for co-polymerisation with other monomers has not hitherto been described. The reaction of diketene with the acrylic acid esters probably takes place in accordance with the following equation:

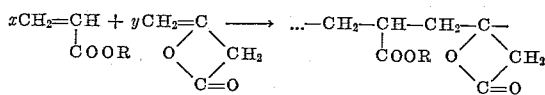

where R denotes an alkyl alcohol radical containing 1 to 14 carbon atoms.

The said co-polymers, which are made in the usual way with the assistance of radical formers, constitute adhesive stringy materials of low cohesion, the K-values of which are between 40 and 110. When spread onto a film of polyethylene terephthalate (polyester film) the co-polymers are soft and poorly anchored to the film. However, when the applied adhesives are heated, e.g. for several hours to 130° C.–150° C., hardening takes places. After hardening, the materials are self-adhesive in the sense necessary for self-adhesive strips, their solubility in organic solvents is greatly reduced and the adhesion of the layer to the suport, even when a polyethylene terephthalate foil (polyester film) is used, is very good even without the provision of a bonding coat.

The hardening time for the mixed polymer may, as noted above, be several hours, but can be reduced from hours to minutes if catalysts, for example, the following, are added to the mixed polymer before the heat treatment:

Acids: Sulphuric acid, phosphoric acid and acid esters thereof (for example, p-octyl-phenyl-phosphoric acid, octyl-phosphoric acid) or sulphonic acids.

Salts: Magnesium chloride, magnesium rhodanide, calcium chloride, zinc chloride, tin (II) chloride, tin (IV) chloride or boron trifluoride.

The properties of the adhesive material containing the co-polymer can be considerably improved, particularly in respect of the hardening time, if hardening is carried out in the presence of reactive thermosetting phenolic resins with the simultaneous addition of a catalyst.

The hardening of polyacrylic acid ester materials with reactive phenolic resins is known per se, but a long time is required for this hardening operation. When the reactive phenolic resins are mixed simply with the diketene/acrylic acid ester co-polymers, no useful results are obtained, since even after relatively long reaction times the material is still greasy, stringy and readily soluble and is unsuitable for self adhesive tapes. An excellent effect is obtained in an extremely short time, however, by the addition of an acid or salt catalyst to the mixture of diketene/acrylic acid ester copolymers with reactive phenolic resins. If this material is spread on to a support, for example, a polyethylene terephthalate foil, and heated to 130° C.–150° C., the material hardens after 5–10 minutes to an extent such that good cohesion is obtained with good stickiness, low swelling and solubility in organic solvents, for example, toluene, and an excellent adhesion to the foil without the use of a bonding coat. Hardening adequate for many purposes has been obtained simply by heating to 100° C. for a period of 10 minutes or to 140° C. for a period of only 2 minutes, the quantity of catalyst being increased somewhat in the latter case. The products are very resistant to heat.

Similar results are obtained in hardening the diketene/acrylic acid ester co-polymers with epoxides or epoxy resins in the presence of a catalyst, such as zinc chloride, under similar conditions.

Hardening may also be performed by ultra-violet radiation, the hardening time being reduced at higher temperature. To improve the adhesive power, small quantities of resins which make the materials sticky, for example, polyterpene resins and terpene phenolic resins, may be added to the diketene/acrylic acid ester co-polymers, without any appreciable effect on the good swelling and solubility characteristics. In this way, it is possible to obtain adhesive materials which have a very good adhesive effect despite considerable cross-linking, and a resultant high resistance to solvents.

The hardness or the degree of cross-linking and hence the properties of the hardened adhesive material may be varied by varying the diketene content of the co-polymers and the amount of phenolic resin or epoxide in the mixtures with the co-polymer.

If the co-polymer is given a very high diketene content, for example, 35 mol-percent and above, hardening of the material may result in a varnish.

It is also possible to vary the properties of these adhesive materials by the polymerisation therein of small quantities of other compounds capable of co-polymerisation with diketene and acrylic acid ester, or by the reaction of other polyfunctional compounds, for example, polyisocyanates, with the co-polymers.

The adhesive materials to be used according to the invention for the production of self-adhesive tapes of high resistance to solvents and heat valve have the following advantages over known adhesive materials used for this purpose:

They do not normally require any bonding coat to anchor the adhesive material to the support materials, and this advantage is obtained even with supports to which conventional adhesives do not adhere without the use of a bonding coat, for example, polyethylene terephthalate foil.

No further addition of organic compounds containing functional groups is necessary to effect hardening of the co-polymer, and hardening can be achieved in extremely short times.

When epoxy or phenolic resins or polyfunctional compounds are added to the co-polymer, the hardening conditions can be modified simply by varying the quantity of catalyst, without it being necessary to vary the quantity of the other components of the adhesive.

Such self-adhesive tapes are particularly suitable for electrical insulation purposes, owing to their very good electrolytic corrosion characteristics.

When the self-adhesive tapes produced according to the invention are used as masking tapes, for example, for the spray-varnishing of metal surfaces, they do not tend to give rise to corrosion.

Finally, the self-adhesive strips produced according to the invention have less adhesion to themselves (adhesive surface against adhesive surface) than to other surfaces.

The following examples will serve to illustrate the invention:

*Example 1*

(a) 128 parts by weight of n-butylacrylate and 17 parts by weight of diketene ($\beta$-hydroxy vinyl acetic acid lactone) were mixed with 417 parts by weight of ethyl acetate with the addition of 0.7 part by weight of dibenzoyl peroxide and the mixture was heated with agitation in a nitrogen atmosphere for 3½ hours at 55° C. 83 parts by weight of ethyl acetate and 0.7 part by weight of dibenzoyl peroxide were then added and the mixture was heated for 6 hours at 60° C. and then for 2 hours at 70° C.

After 1 hour, polymerisation occurred with heating, and the viscosity of the solution increased (K-value: 60–65).

The resultant co-polymer may be applied to the support directly from the solution or after concentration of the solution.

(b) 184 parts by weight of iso-octyl acrylate and 17 parts by weight of diketene were subjected to mixed polymerisation in the manner described under (a) (K-value: 60–65).

An approximately 30% solution of the resultant co-polymers in ethyl acetate were brushed onto polyester foil, dried at 20° C. and heated to 140° C. for at least 2 hours, to give pressure-sensitive adhesive tapes which, for coating weights of about 50 g. per square metre, had adhesive powers of about 150 g. per cm. (measured on steel with a rate of feed of 20 cm. per minute).

To test the resultant pressure-sensitive adhesive tapes as to their resistance to the action of organic solvents, test pieces of the adhesive tapes were weighed and immersed in 100 ml. of toluene at room temperature for a period of 24 hours. At the end of this time the test pieces were taken out of the solvent, weighed after removal of the excess toluene, then dried for half an hour at 120° C., and re-weighed.

After 24 hours immersion in toluene, the swelling value, i.e.

$$\text{Swelling value} = \frac{\text{solvent absorbed by the undissolved quantity in g.} \times 100}{\text{undissolved substance in g.}} \text{ in percent}$$

was 800–1700% and the solubility value, i.e.

$$\text{Solubility value} = \frac{\text{dissolved material in g.} \times 100}{\text{substance applied in g.}} \text{ in percent}$$

was 25–35%.

After hardening by heating for several hours to 140° C., the adhesive substances exhibited good cohesion, low twist and hardly any stringiness.

*Example 2*

(c) A mixture of 100 parts by weight of co-polymer (a) or (b) according to Example 1 and 0.4 part by weight of zinc chloride, dissolved in ethyl acetate, was spread at a coating weight of about 50 g. per square metre on to a polyethylene terephthalate foil and dried at 20° C.

(d) A mixture of 100 parts by weight of co-polymer (a) or (b) according to Example 1 and 0.4 part by weight of octyl phosphoric acid, dissolved in ethyl acetate, was spread at a coating weight of about 50 g. per square metre on to crepe paper and dried at 20° C.

The specimens were then heated for 10 minutes at 140° C. The adhesive forces of the resultant adhesive bands were between 120 and 150 g. per cm., the swelling values were less than 2000% and the solubility values were between 20 and 40%. The swelling values and the solubility values were determined as in Example 1.

The adhesive substances of the adhesive bands produced according to this example exhibited good cohesion and practically no stringiness.

*Example 3*

The following mixtures were made:

(e) 100 parts by weight of co-polymer (a) according to Example 1, 16 parts by weight of heat-reactive phenolic resin (softening point 88° C.–100° C., specific gravity 1.10), 0.4 part by weight of zinc chloride.

(f) 100 parts by weight of co-polymer (b) according to Example 1, 16 parts by weight of heat-reactive phenolic resin (softening point 88° C.–100° C., specific gravity 1.10), 0.4 part by weight of zinc chloride.

(g) 100 parts by weight of co-polymer (a) according to Example 1, 10 parts by weight of epoxy resin (condensation product of bisphenol and epichlorohydrin epoxy value 0.48–0.57, liquid, hydroxyl value 0.16, mol-weight 380), 0.8 part by weight of zinc chloride.

The mixtures were spread in the form of a solution in ethyl acetate on to polyester foil, aluminium foil, and polyester foil, to which aluminium had been applied by vapourisation, dried at 20° C., and then heated for 10 minutes at 140° C. The adhesive force, swelling and solubility values were then measured.

Using polyester foil as support, the values given in the following table were obtained:

| Substance Example 3 | Coating weight, g./sq. m. | Adhesive Force, g./cm. | Swelling value, percent | Solubility value, percent |
|---|---|---|---|---|
| (e) | 38 | 220 | 430 | 21 |
| (f) | 68 | 110 | 350 | 23 |
| (g) | 42 | 81 | 480 | 30 |

To test the heat-resistance, a steel plate measuring 4.8 x 10 cm. and of a thickness of 1.6 mm. was polished in the longitudinal direction with Carborundum paper and cleaned with hot benzine. An adhesive tape measuring approximately 15 cm. in length and 2 cm. in width was stuck on to the steel plate in such a manner that a length of 2.54 cm. (=1 inch) rested on the steel plate from the edge of one narrow side, and the piece of the adhesive tape sruck on the steel was pressed into contact by slowly rolling a 2 kg. roller to and fro, once. The free end of the tape was loaded with an 800 g. weight when suspended vertically. The test was performed at 120° C. and the time was measured until the tape fell away or until the tape slid on the plate in the direction of tension (creep).

The substances hardened with phenolic resin—Examples 3 (e) and (f)—withstood this test for 24 hours and no creep was observed. Conventional tapes with non-hardened acrylic ester adhesives, similarly tested, fell away before 10 minutes had elapsed.

All three adhesive materials, Examples 3 (e), (f) and (g), exhibited very good cohesion, no twisting or stringiness and adhered very well to the polyester foil without a bonding coat. The adhesive surfaces of the adhesive tapes provided with these substances stuck to one another less than to other surfaces.

The adhesive materials exhibited the same good properties when applied to aluminium foil, polyester foil to which aluminium had been applied by vaporisation, and impregnated crepe paper. By comparison, parallel tests using polyacrylic acid ester materials containing no diketene gave soft, greasy and stringy materials.

The support material for the production of solvent-resistant and heat-resistant pressure-sensitive adhesive strips or adhesive sheets according to the invention may be flexible materials of the most diverse kinds, for example, of plastics, natural substances which are modified if required, asbestos fibres, glass fibres, metal or the like, in the form of foils, fabrics, felts, paper or the like. The support material selected should have the required heat-resistance and advantageously not undergo adverse changes when subjected to treatments of short duration at temperatures of up to about 140° C. The support material may be impregnated on the side remote from the adhesive coating or be provided with an adhesive-repellent back coating.

The pressure-sensitive adhesive tapes and adhesive sheets which are resistant to solvents and heat according to the invention may be provided with the adhesive substance on one or both sides, and the adhesive substance may vary in respect of hardening and adhesive force on the two sides, so that the adhesive tapes can be wound into reels with or without an interlayer.

We claim as our invention:

1. A pressure sensitive adhesive coated sheet material comprising a flexible backing having bonded thereto a pressure sensitive adhesive material in the form of a cured coating of a copolymer of monomers comprising (a) at least one monomeric acrylic ester of a non-tertiary alkyl alcohol having from one to fourteen carbon atoms, and (b) a minor amount of diketene, the amount of diketene being selected to provide a normally tacky and pressure sensitive adhesive copolymer, said amount of diketene being less than about thirty-five mole percent of the total amount of monomers, said cured coating being formed by curing the coating at a temperature between about 100° to 150° C.

2. A pressure sensitive adhesive coated sheet material according to claim 1 in which the adhesive material further contains a resin selected from the group consisting of polyterpene and terpene phenolic resins.

3. A pressure sensitive adhesive coated sheet material according to claim 1 in which the adhesive material contains an acidic catalyst employed in curing the coating.

4. A pressure sensitive adhesive coated sheet material comprising a flexible backing having bonded thereto a pressure sensitive adhesive material in the form of a cured coating of (1) a copolymer of monomers comprising (a) at least one monomeric acrylic acid ester of a non-tertiary alkyl alcohol having from one to fourteen carbon atoms, and (b) a minor amount of diketene, the amount of diketene being selected to provide a normally tacky and pressure sensitive adhesive copolymer, said amount of diketene being less than about thirty-five mole percent of the total amount of monomers, and (2) a reactive and heat-curable resin compatable therewith and selected from the group consisting of thermosetting phenolic resins and thermosetting epoxy resins, said cured coating being formed by curing the coating at a temperature between about 100° to 150° C.

5. A pressure sensitive adhesive coated sheet material according to claim 4 in which the adhesive material further contains a resin selected from the group consisting of polyterpene and terpene phenolic resins, and an acidic catalyst employed in curing the coating.

References Cited by the Examiner

UNITED STATES PATENTS

| | | | |
|---|---|---|---|
| 2,281,589 | 5/42 | Mitchell | 117—76 |
| 2,553,816 | 5/51 | Ebel | 117—122 |
| 2,734,503 | 2/56 | Doyle | 117—122 |
| 2,799,596 | 7/57 | Frantz | 117—122 |
| 2,884,126 | 4/59 | Ulrich | 117—122 |
| 2,925,174 | 2/60 | Stow | 117—76 |
| 2,973,286 | 2/61 | Ulrich | 117—122 |
| 3,008,850 | 11/61 | Ulrich | 117—122 |

OTHER REFERENCES

Golding B.: "Polymers and Resins," New York, Van Nostrand Co. Inc., 1959 pp. 454–462.

WILLIAM D. MARTIN, *Primary Examiner*.

MURRAY KATZ, RICHARD D. NEVIUS,
*Examiners.*